Figure 1:
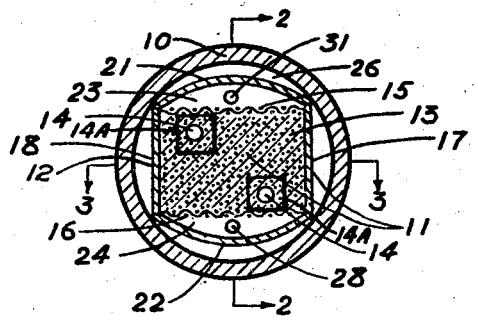

Sept. 28, 1948.  L. F. MAREK  2,450,289
GAS-TREATING APPARATUS
Filed April 15, 1944

INVENTOR
LEROY F. MAREK
By Frank M. Houghton
HIS AGENT

Patented Sept. 28, 1948

2,450,289

UNITED STATES PATENT OFFICE 2,450,289

GAS TREATING APPARATUS

Leroy F. Marek, Lexington, Mass., assignor to Arthur D. Little, Inc., Cambridge, Mass., a corporation of Massachusetts Application April 15, 1944, Serial No. 531,150

3 Claims. (Cl. 23—281)

This invention relates to the separation of gases and more particularly to an apparatus and a process for separation by chemical means of a gaseous component from a gaseous mixture, e. g. of oxygen from air.

At the present time the principal source of commercial oxygen is obtained from the distillation of liquid air, which process yields oxygen of about 99.8% purity. Several processes dependent upon chemical reactions are known including the electrolysis of water and the decomposition of oxides or oxy-compounds by heat or by chemical reaction. These latter processes have not been widely used because of their high cost and because of the difficulty of obtaining oxygen sufficiently free of nitrogen and other inert gases.

The isolation of oxygen from air by the utilization of an oxygen regenerative material is, however, inherently a cheap and efficient method of manufacturing oxygen. A difficulty, and one that has barred its wide commercial use to date, has been the lack of suitable oxygen regenerative material and an inexpensive, efficient apparatus for handling it so as to produce oxygen sufficiently free of inert gases. As a small number of satisfactory oxygen regenerative materials have been discovered in a group of compounds known as chelates, the problem remaining is to devise a suitable process and apparatus for utilizing the material which is in the form of a granular powder. These regenerative materials are described more fully below.

The regenerative compounds belong to a class known as chelate compounds, of which the cobalt derivatives are of particular interest. The compounds are the cobalt derivatives of salicylaldehyde substituted ethylene diamine, and substitution products thereof, all having the general formula:

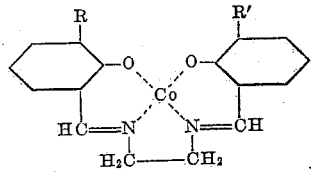

These compounds exhibit a considerable range of properties and hence can be used under a corresponding variety of conditions, as indicated below.

The parent compound in this series is the cobalt derivative of salicylaldehyde substituted ethylene diamine, which is unsubstituted at R and R' (i. e. wherein R and R' are hydrogen). This compound is also known as "Co-Sal-En" and as "Sal-comine." It has a theoretical oxygen capacity of 4.95% of its own weight and absorbs oxygen from air at room temperatures with a heat release of about 1100 B. t. u. per pound of oxygen absorbed. The oxygen-saturated material will desorb oxygen into a vacuum at temperatures as low as 30° C. and the half saturated compound will desorb oxygen against a pressure of one atmosphere at a temperature between 50 and 60° C.

The 3-methoxy and 3-ethoxy derivatives of Salcomine, known respectively as "Methomine" and "Ethomine," also have the property of absorbing and desorbing oxygen as does the parent compound. Their structures correspond to that of the foregoing formula wherein R and R' are respectively methoxy groups, —OCH$_3$, or ethoxy groups, —OC$_2$H$_5$. Ethomine functions in a higher temperature range than Salcomine, i. e. will absorb oxygen from air at a higher temperature than Salcomine and requires a higher temperature for desorption, but deteriorates at a considerably higher rate.

A number of other derivatives of Salcomine are also capable of use as oxygen regenerative materials.

The purpose of this invention is broadly to provide a process and apparatus which will yield a gaseous component from a gaseous mixture and more particularly oxygen from air with the aid of certain granular powders by means of a cyclical chemical process, said gaseous component or oxygen being substantially free of other gases, in a simple yet efficient manner.

In the preparation of oxygen from air by means of granular, regenerative chemical compounds, such as the chelates referred to above, it is of advantage to have a large heat transfer surface in contact with the granular compound for the purpose of rapid heating and cooling. A practical method is to mount a bundle of finned tubes in a holder with enclosed sides, and with a screen or foraminous top and bottom to retain the granular material, pack the granular material around the tubes and fins, flow heat transferring fluid through the tubes and blow compressed air into either the top or bottom through the screens and through the granular material. A rectangular form for this holder permits good air distribution throughout the mass of granular material, gives low pressure drops, and facilitates filling and dumping of the chemical.

The process includes the use of compressed air, not only because it is essential for inducing some compounds to absorb oxygen, but also for other reasons. The compression of the air serves to remove water vapor which is present and which would cause difficulty if not removed; furthermore the compression of air allows a greater volume of air to come in contact with the regenerative material than would be possible without employing excessive velocities of air through the material. Forcing air through the granular material at a rapid rate would tend to blow the material out of its container, and would entail an uneconomic use of power.

Since it is desirable, and with some regenerative compounds necessary, to have the air under pressure, a cylindrical vessel is desirable rather than a rectangular case since the pressures may be retained with a lighter-weight shell. An arrangement of the rectangular holder within the cylindrical shell functions satisfactorily except that oxygen purity is sacrificed by dilution with nitrogen left in the spaces between the oxygen regenerating material container and the cylindrical shell when absorption is finished and desorption is about to begin. This is true even when the air (after absorption is complete) is vented to the atmosphere and further evacuated from the case before oxygen is desorbed. This undesirable nitrogen dilution may be avoided by: (a) evacuation of the case to an impractically low pressure before desorption of oxygen from the chelate compound, or by (b) filling the spaces with some inert material. This latter is awkward, adds weight to the case and may cause trouble by oxidation or decomposition of the filling material.

I have found a satisfactory way around this difficulty by using the following apparatus and procedure. The granular oxygen-absorbing material is packed around heat exchange finned tubes. Over the top and bottom of this assembly are mounted screens or foraminous plates to retain the granular material and still allow free flow of air throughout the material. This unit will be referred to hereinafter as the powder bed. The powder bed is enclosed in a holder, the sides of which fit snugly against the sides of the powder bed, while the top and bottom sides of the holder are spaced from the screens or foraminous plates (though fitting closely to the edges) to form distributing and collecting chambers for the gases flowing through the bed. The distributing and collecting chambers thus formed may be referred to as plenum chambers. The combination of holder and powder bed will hereinafter be referred to as the reaction chamber, for convenience.

This reaction chamber, which in practice is generally rectangular in shape—preferably having flat rectangular sides and a more or less convex top and bottom—is positioned within an outer container of cylindrical shape. The walls of the reaction chamber are relatively thin, as compared with those of the outer container, and are not capable of resisting pressures of the order of those used in the apparatus. The outer cylindrical container is made so as to be resistant to such pressures. The advantages of this are evident from the fact that a cylindrical shape of given wall thickness is more resistant to distortion and rupture than is a rectangular or other angular or irregular shaped container of the same wall thickness.

By means of small openings in the top or bottom of the reaction chamber the space between it and the shell or cylinder can be brought to and maintained at substantially the same pressure as that within the reaction chamber. When using this type of construction by the process of this invention contamination of oxygen with nitrogen from the space outside the reaction chamber does not occur.

When using this equipment to generate oxygen, air under pressure is admitted to the reaction chamber. The pressure within the chamber, and that external to it but within the cylinder or shell, in the space hereinafter called the cylinder space, become equalized by flow of air through the opening or openings in the top or bottom of the reaction chamber. The air admitted to the reaction chamber under pressure passes through the granular chemical oxygen absorbing-desorbing material until the desired degree of absorption is obtained. Air flow is stopped, the pressure is released to atmospheric on both sides of the reaction chamber, the case is evacuated to a reasonably low pressure, and desorption is ready to start. When oxygen is regenerated from the chemical, it forces nitrogen (and some oxygen) from the mass of chemical in the reaction chamber through the equalizing openings and into the cylinder space until desorption pressure is reached. Desorption is then carried to completion at a pressure above or equal to the evacuation pressure. Nitrogen left in the cylinder space at the end of evacuation and driven into the cylinder space at the start of desorption does not bodily return to the holder and thus does not contaminate the oxygen produced.

An alternative procedure and arrangement is as follows: After the evacuation step has been carried out, previously stored oxygen is allowed to enter through the conductor means used to evacuate the reacting chamber to bring the pressure to about atmospheric pressure. Such a pressure is maintained by means of control valves during desorption.

In either case substantially pure oxygen is obtained. The cycle is then repeated until sufficient oxygen has been stored.

In order more fully to describe my invention, but not as a limitation thereof, reference may be made to the accompanied drawings and to the following detailed discussion.

Figure 2:
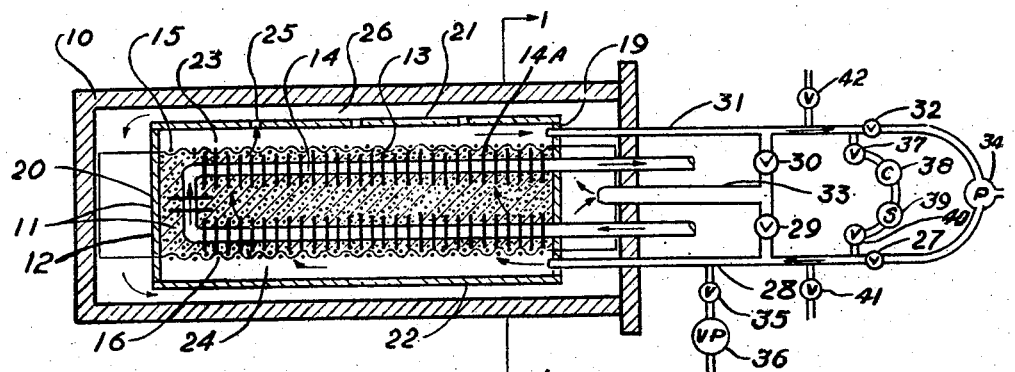

In the drawings, Fig. 1 is a cross-sectional end view of the apparatus taken on the line 1—1 of Fig. 2; Fig. 2 is a cross-sectional side elevational view taken on the line 2—2 of Fig. 1; and Fig. 3 is a top cross-sectional view taken on the line 3—3 of Fig. 1.

Figure 3:
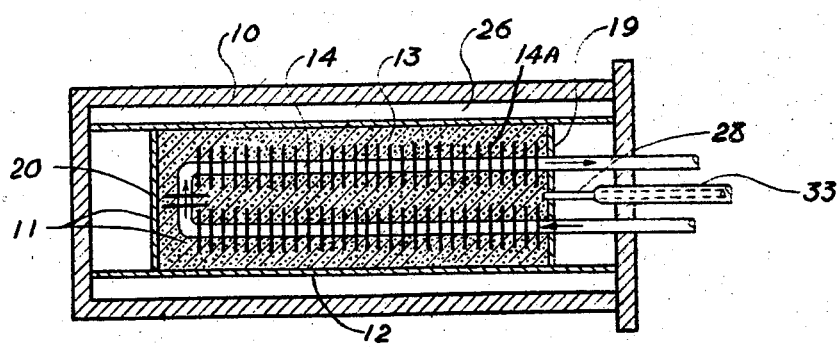

Referring to Figs. 1, 2 and 3, the shell or cylindrical container 10 encloses the reaction chamber 11 and is made sufficiently strong to withstand the alternate pressure and vacuum used in the process. Reaction chamber 11 consists of a holder 12 which encloses powder bed 13. The powder bed consists of an oxygen regenerative chemical packed around heat exchange finned tubes 14 and covered by screens or foraminous plates 15 and 16. The finned tubes are provided with fins 14A and serve to carry heat from a heat transfer material to the chemical and, though they pass through all parts of the powder bed, are shown diagrammatically as one tube with fins for purposes of convenience. The holder 12 consists of sides 17 and 18 and ends 19 and 20 of suitable imperforate metal such as light gauge steel. The holder 12 is also provided with top and bottom covers 21 and 22 respectively, which do not, however, fit closely to the screens or foraminous plates 15 and 16, except along the edges, but are made convex or in some other suitable shape so that spaces 23 and 24 are provided. In the cover 21 are small holes 25 which provide communication between the interior of reaction chamber 11 and the cylinder space 26, which space is present because the reaction chamber 11 does not fill the entire space of the shell or cylindrical container 10. The cover 21 of the holder 12 is removable so that powder bed 13 may be removed and cleaned, repaired, filled, etc., as necessary.

Reaction chamber 11 may be made somewhat shorter in length than cylinder 10, as shown in Figs. 2 and 3, and when so made, the sides are extended to meet either end of the cylinder as shown in Fig. 3. The purpose of these extensions of the sides is to assure the proper fitting of the reacting chamber in the shell or cylindrical container 10.

The following examples will serve more particularly to describe the present invention.

Air is admitted under pressure, as by pump 34, into space 24 through valve 27 in line 28, valves 29, 32, 35, 37, 40, 41 and 30 being closed. The air passes through the screen or foraminous plate 16 into the powder bed 13. Oxygen is then removed by the regenerative chemical and the spent air passes through the screen or foraminous plate 15 at the top of the container. Through holes 25 in the top cover 21, the spent air is allowed to escape into the cylinder space 26 thus allowing the pressure to be equalized both inside and out of the reacting chamber. Exhaust air is removed by line 31, valve 42 being open, but is adjusted to maintain a substantial pressure within the cylinder 10.

At the completion of this step, i. e. when the desired amount of oxygen has been absorbed, valves 27 and 42 are closed, valve 35 opened, and the pressure inside the cylinder is reduced to a substantial vacuum, as by vacuum pump 36, i. e. about 27 inches of mercury vacuum. One of the purposes of this procedure is to remove all possible inert gases remaining in the chamber which would contaminate the oxygen produced. By circulating heating fluid through heat exchange means 14, oxygen is liberated in the powder bed 13. As this causes some pressure, the tendency is for the oxygen to flow through holes 25 rather than for inert gases left in the cylinder space 26 to flow out with the oxygen. The oxygen is removed by line 31, compressed by compressor 38 and stored in storage tank 39, valve 37 being open and the others closed. Toward the end of the reaction, the pressure in the chamber 11 may fall somewhat below that of the cylinder space 26 thus tending to cause a flow back of gases within the cylinder space, through the holes 25. There is, however, a blanket of oxygen just over these holes, due to the previously existing positive pressure within the reaction chamber 11, which prevents any significant quantity of inert gases from reentering the chamber. It may be readily appreciated, therefore, that by means of this particular device substantially pure oxygen may be obtained. In practice 98% oxygen has been obtained.

The above procedure may be modified in several ways. Because the pressure drop between the interior of the reacting chamber 11 and the cylinder space 26 may be undesirably great under particular conditions, air may be admitted simultaneously through line 33 and line 31, valves 27, 35, 42, 37, 40 and 29 being closed and valves 30, 32 and 41 open. It is to be noted that air is admitted into the reacting chamber in this process on the same side as the holes 25 as contrasted with the previous method wherein the air was admitted at the far side. When the container is being evacuated for the purpose of removing inert gases and prior to the removal of oxygen, all valves are closed except valves 29 and 35. Such a modification as just described permits more rapid equalization of pressures within and without the reaction chamber 11. Because of this auxiliary pressure-equaling device, the holes 25 may be reduced in number or eliminated altogether. Ordinarily the holes are left so that the following operation may be performed. Before generation of oxygen is started by introduction of heating fluid to the heat transfer coils, the vacuum produced in the preceding evacuation is eliminated by allowing oxygen to flow from the storage tank 39 through line 28 (valves 27, 29 and 35 being closed and valve 40 opened) until the pressure reaches one atmosphere or more. This pressure is substantially maintained during the evolution of oxygen from the reacting chamber 11. One of the important effects of this modification is that the admitted oxygen sweeps out of the powder bed any residual inert gases present into cylinder space 26 and at the same time creates a blanket of oxygen over the holes 25. As the pressure of the reacting chamber is not reduced below that existing in cylinder space 26, there is no return of the inert gases. By this modification even higher purity of oxygen may be obtained, for example yields containing 99.8% oxygen are not unusual.

Air is shown being admitted at the bottom (first illustration) or at the top (second illustration) and oxygen and exhaust air removed at the opposite exit. The particular arrangements may be modified to suit particular conditions; for example the places of admission and exit of the gases may be at the same level (with reference to the drawings) so that the gases will pass from side to side of the powder bed instead of between top and bottom.

If Salcomine is used as the regenerative chemical the following air pressures, rates of flow and temperatures, may be advantageously used in the two illustrations shown above. The pressure on the air during absorption may vary from 0 to 100 lbs. gage although a range of 80 to 100 lbs. gage is preferred. The pressure during desorption may vary from one-tenth atmosphere absolute to 4 lbs. gage although an absolute pressure of from ⅓ to ¼ atmosphere is preferred.

So long as any air flows over the Salcomine under the proper conditions absorption of oxygen will take place, but a rate of 0.35 to 0.4 C. F. M./lb. of Salcomine is preferred.

During absorption the cooling fluid, which preferably is water, may be at any temperature between 25° F. to 100° F. During desorption the heating fluid should be at a temperature of from 212° F. to 230° F. In the case of water or steam, pressure is necessary to obtain these temperatures.

Throughout the specification reference has been made to a substantially rectangular powder bed and reaction chamber for the heat exchange means and the oxygen-regenerating chemical. Any other suitable container for these materials such as a pentagonal or hexagonal shaped container falls within the scope of this invention. The rectangular shape is preferred since it permits more uniform distribution of air flow throughout the granular material during the absorption period. The importance of this achievement is that full utilization of active granular material is facilitated and that more efficient use is made of the air fed to the powder bed.

I claim:

1. An apparatus for separating a gaseous component from a gaseous mixture, comprising an inner container in the shape of a rectangular parallelepiped disposed in and resting on its long edges in an outer cylindrical chamber longer than said inner container and thereby defining a space between said inner container and said outer chamber, finned heat exchange means positioned within said inner container, foraminous means within said inner container and spaced from the walls thereof between said walls and said heat exchange means, and adapted to retain about said heat exchange means an absorbing-desorbing material for said gaseous component, pipe means for supplying said gaseous mixture to the interior of said container, openings communicating between the inner container and the outer chamber, and pipe means for conducting said gaseous component from within said inner container.

2. An apparatus for separating a gaseous component from a gaseous mixture, comprising an inner container adapted to hold an absorbing-desorbing material for said gaseous component, said container being of irregular shape having walls which are readily distorted or ruptured by relatively small superatmospheric pressures, an outer cylindrical chamber surrounding said inner container and resistant to heavier pressures than said inner container, said inner container and outer chamber being in contact only along the edges of the former so as to provide spaces between said inner container and said outer chamber, said spaces being in open communication with each other, heat exchange means positioned within said inner container and adapted to contact said material, foraminous means within said container spaced from the walls thereof for retaining said material, a pipe extending through said outer chamber and inner container into the space on one side of said foraminous means for introducing gases thereto, a pipe extending through said outer chamber and inner container into the space on the opposite side of said foraminous means for withdrawing gases, a wall of said container having openings communicating between the spaces formed by the walls of said chamber and the walls of the container and the spaces between the latter and the said foraminous means.

3. An apparatus for separating oxygen from air comprising a container in the shape of a rectangular parallelepiped for holding oxygen absorbing-desorbing material, heat exchange means positioned within said container and adapted to contact said material, a cylindrical pressure resistant chamber surrounding said container, said container and said chamber being in contact only along the frame of said container so as to provide communicating spaces between said chamber and said container, foraminous means within said container spaced from the walls thereof for retaining said material, a pipe extending through said outer chamber and inner container into the space on one side of said foraminous means for introducing gases thereto, a pipe extending through said outer chamber and inner container into the space on the opposite side of said foraminous means for withdrawing gases, a wall of said container having openings communicating between the spaces formed by the walls of said chamber and the walls of the container and the spaces between the latter and the said foraminous means.

LEROY F. MAREK.

REFERENCES CITED

The following references are of record in the file of this patent:

UNITED STATES PATENTS

| Number | Name | Date |
|---|---|---|
| 1,048,812 | Doherty | Dec. 31, 1912 |
| 1,091,023 | Sinding-Larson | Mar. 24, 1914 |
| 1,753,067 | Ray et al. | Apr. 1, 1930 |
| 2,083,732 | Moore et al. | June 15, 1937 |
| 2,217,850 | Warne et al. | Oct. 15, 1940 |

FOREIGN PATENTS

| Number | Country | Date |
|---|---|---|
| 14,925 | Great Britain | 1890 |
| 365,680 | Germany | Dec. 21, 1922 |

OTHER REFERENCES

Tsumaki, Bull. Chem. Soc. Japan, vol. 13, No. 2, 1938, pp. 252–260.